Figure 1:
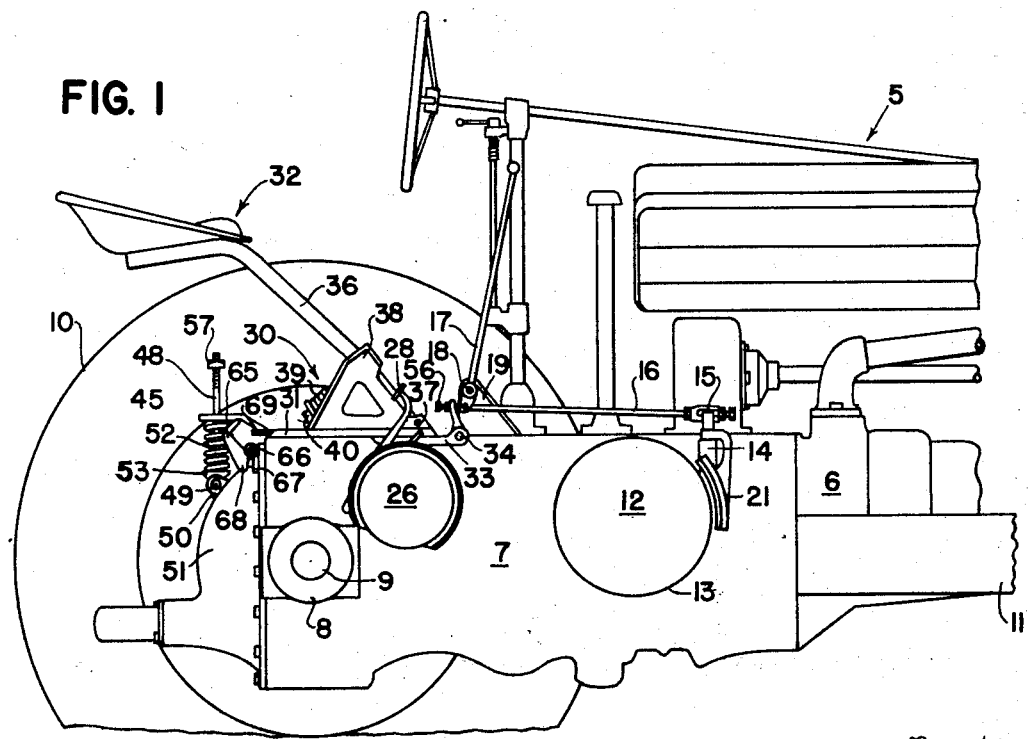

Sept. 16, 1941.    T. BROWN    2,256,238
SAFETY CONTROL DEVICE
Filed April 18, 1940

INVENTOR:
THEOPHILUS BROWN
BY
ATTORNEYS.

Patented Sept. 16, 1941

2,256,238

UNITED STATES PATENT OFFICE 2,256,238

SAFETY CONTROL DEVICE

Theophilus Brown, Moline, Ill., assignor to Deere & Company, Moline, Ill., a corporation of Illinois Application April 18, 1940, Serial No. 330,307

8 Claims. (Cl. 180—82)

The present invention relates generally to safety control devices and more particularly to safety control devices of the type generally known as "dead man" control adapted to stop a vehicle when the operator becomes incapacitated. Most of the "dead man" control devices of which I am aware comprise electrical switch devices adapted to interrupt a flow of current either in a main power circuit or in the ignition circuit of an internal combustion engine. Inasmuch as such electrcal devices are expensive and require an appreciable amount of maintenance, the principal object of the present invention is to provide a novel and simplified "dead man" control device for engine driven vehicles such as buses, trucks, tractors, etc., which directly actuates either the clutch lever or the brake lever, or both.

It is desirable that the controls of some vehicles be adapted for operation by the operator either in a sitting or standing position, therefore it is a more specific object of my invention to provide a control device for stopping the vehicle when the operator falls from his support from either a sitting position or a standing position but which does not affect the operation of the vehicle nor require any attention during normal operation. In the accomplishment of this object I have provided a novel platform and seat assembly which is movably mounted on the vehicle and biased for movement into engagement with the clutch lever and the brake lever to actuate these levers when the seat and platform assembly is relieved of the operator's weight, thereby disengaging the clutch and applying the brakes.

It is also desirable at times to operate a vehicle such as a tractor without the operator being in position on the seat or platform, such as when backing the tractor into coupling connection with an implement or trailing vehicle, at which time the operator stands behind the tractor and actuates the clutch lever by hand to back the tractor into position for making the coupling connection. At other times it is desirable to use the tractor to furnish power through its belt pulley or power take-off shaft to operate stationary machines such as threshers, corn shellers, and hammer mills, without an operator on the seat or platform. The same also applies as to trucks having such stationary machine mounted thereon in which the truck engine is used for driving the machine. It is therefore a further object of my invention to provide means for locking out the safety control device when so desired.

In this connection, however, it is a more specific object of my invention to provide a lock-out means for the safety control, which is automatically disabled when the operator again mounts the platform for driving the tractor or other vehicle, for it is not deemed to be wise to rely upon the operator's memory or initiative to disable the locking means when he again wishes to drive the tractor or other vehicle in field service.

Although I have shown and described an embodiment in which a "dead man" control is applied to a tractor, I do not intend my invention to be limited to this type of vehicle, but contemplate its application to any other vehicle which is suitable for such control means.

Figures 2, 3:
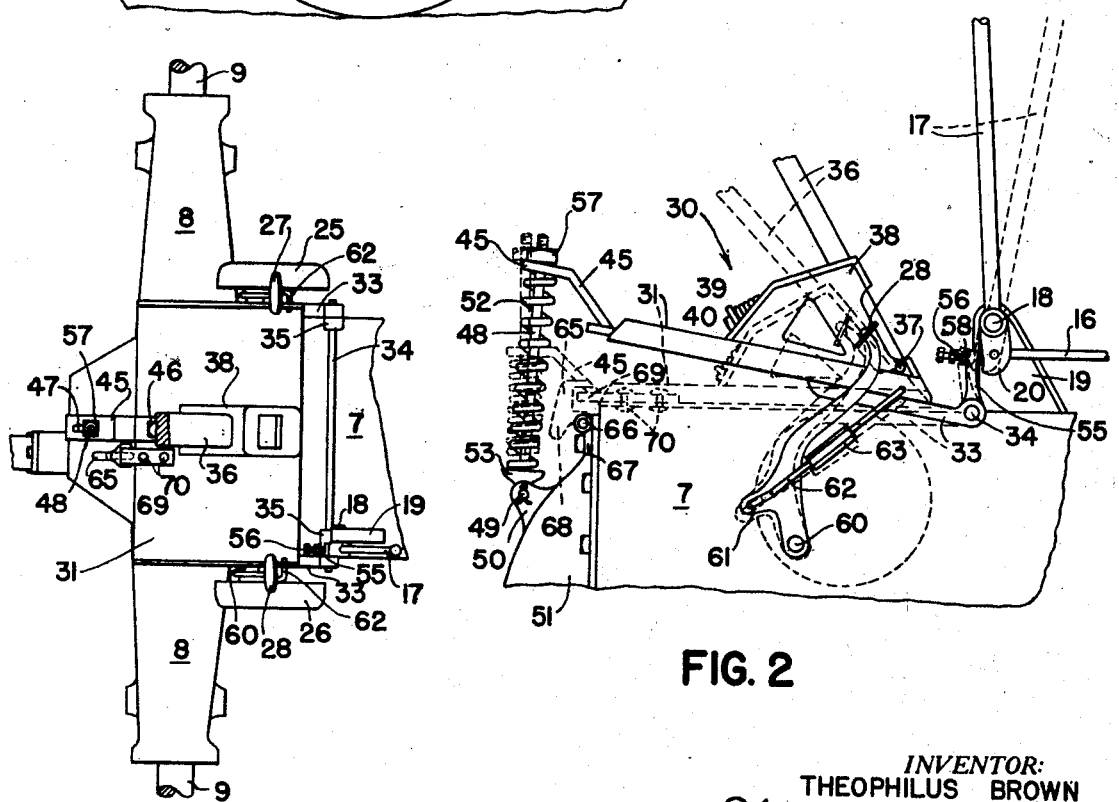

These and other objects and advantages of my invention will be apparent after a consideration of the following description in which reference is had to the drawing appended hereto, in which Figure 1 is a side elevational view of a tractor embodying the principles of my invention and in which the near wheel is removed to more clearly show the details of construction, the parts being shown in the positions occupied during normal travel of the tractor with an operator on the operator's platform;

Figure 2 is a side elevational view, drawn to an enlarged scale, of the safety control mechanism in which is shown in dotted lines the position of the platform and mechanism when the operator is away from his station, while the dotted lines show the position of the platform with the locking device in place, just before the operator's weight is relieved from the operator's platform; and Figure 3 is a fragmentary plan view showing the rear end of the tractor and the operator's platform with the safety control device as shown in Figure 1.

Referring now to the drawing, the tractor, indicated in its entirety by the reference numeral 5, comprises a centrally disposed body including an engine 6 and a transmission housing 7 supported on a pair of opposed laterally extending rear axle housings 8 out of which project a pair of drive axles 9 upon which the rear traction wheels 10 are mounted. The forward end of the tractor 5 is carried on a framework 11 mounted on suitable front dirigible wheels (not shown). The engine 6 is connected to the transmission mechanism in the transmission housing 7 by means of clutch mechanism, indicated by reference numeral 12, which may be of any conventional type such as, for instance, disclosed in Patent No. 1,702,371 granted to Witry, February 19, 1929 to which reference can be had for specific details of the clutch mechanism, although I do not intend my invention to be limited to this particular form of clutch. In the form of clutch disclosed in the above patent, which is employed in the preferred embodiment of the present invention, the housing 13 of the clutch 12 is rotatable and serves as a belt pulley for furnishing power to stationary implements such as threshers, corn shellers, hammer mills, etc. The clutch mechanism is engaged and disengaged by means of a rock shaft 14 extending vertically to an arm 15 which is connected by means of a rearwardly extending rod 16 to a hand lever 17 which is pivotally connected by means of a transverse pin 18 to a bracket 19 fixed to the top side of the transmission housing 7. The hand lever 17 has an extension 20 below the pivot pin 18 to which the clutch actuating rod 16 is connected. The clutch is engaged by pushing forwardly on the hand lever 17, into the position shown in Figure 1 and in dotted lines in Figure 2, and is disengaged by pulling the handle rearwardly to the position shown in solid lines in Figure 2. A brake shoe 21 is provided for stopping the belt pulley 13 when the clutch 12 is disengaged, and is actuated by a suitable connection with the actuating arm 15 and which forms no part of the present invention.

The tractor is provided with a pair of oppositely disposed brake mechanism 25, 26 which are provided for independently braking the rear traction wheels 10 of the tractor for purposes well known to those skilled in the art, the details of which may be found, if desired, by reference to Patent No. 2,103,543, granted December 28, 1937, to McCormick and Worthington. For purposes of the present invention, however, it is sufficient to state that each of the brake mechanisms 25, 26 is provided with its individual brake pedal 27, 28, respectively, and by pressing forwardly upon these pedals the corresponding tractor wheel 10 can be retarded.

The operator's support, indicated in its entirety by reference numeral 30, comprises a platform 31 upon which is mounted a seat 32. The platform 31 extends transversely across the width of the central body portion 7 of the tractor and is supported at its forward end upon a pair of laterally spaced supporting arms 33, which are rigidly fixed to a transversely disposed rock shaft 34, which is journaled in suitable supporting bearings 35 fixed to the top side of the transmission case 7.

The seat 32 comprises an upwardly and rearwardly extending standard 36 pivotally connected at 37, at its lower end, to a bracket casting 38 which is rigidly fixed to the pivoted platform 31. The seat standard 36 is swingable downwardly against a compression spring 39 which reacts against a mounting bolt 40 connected to the bracket casting 38 in a manner well known to those skilled in the art.

Projecting rearwardly from the rear edge of the platform 31, is a rigid arm 45 which is fixed to the platform by suitable bolts or rivets 46 and has a longitudinally extending slot 47 at its rear end, adapted to receive a bolt 48. The bolt 48 is pivotally supported at its lower end on a transverse pivot pin 49 carried in a supporting lug 50 on the rear axle housing cover 51.

A coiled compression spring 52 encircles the bolt 48 and bears against the under side of the arm 45 reacting against a lug 53 at the lower end of the bolt 48, and tending to force the platform 31 upwardly about the axis of the rock shaft 34 to an upwardly and rearwardly inclined position, as indicated in solid lines in Figure 2.

An arm 55 projects upwardly from one of the supporting arms 33 of the platform and is formed integrally therewith. The arm 55 extends upwardly behind the downward extension 20 of the lever 17 and carries an adjustable set screw 56 at its upper end, which is threaded into a suitable aperture in the arm 55 and projects forwardly therefrom into engagement with the lever extension 20 when the platform 31 is in raised position on the spring 52, the upper limit of swinging movement being determined by a nut 57 engaging the upper threaded end of the bolt 48 above the arm 45. The set screw 56 is adjusted by screwing it forwardly or rearwardly in the upper end of the arm 55 to a position in which it engages the clutch lever 17 when the latter is in disengaged position and the platform is up against the stop nut 57. The spring 52 is adapted to be overcome by the weight of an operator standing on the platform 31 for sitting in the seat 32, and compressed until the platform 31 is solidly engaging the top of the transmission housing 7, but is of sufficient strength when acting through the arm 45, platform 31, and arm 55, to force the clutch control lever 17 from engaged position to disengaged position when the operator is off the operator's support. The set screw 56 is locked in adjusted position by means of a lock nut 58.

Thus it is evident that with the nut 57 and set screw 56 in proper adjustment, the clutch control lever 17 can be manually manipulated without interference from the set screw 56 when an operator is sitting or standing upon the support 30, but should he dismount or fall from the support 30 during forward movement of the tractor, the spring 52 will force the platform upwardly and force the arm 55 forwardly against the lower extension 20 of the clutch lever 17 with sufficient force to disengage the clutch and cause the tractor to come to a stop.

In order to insure that the tractor comes to rest quickly enough to avoid injury to the operator, in case he should fall in front of a trailing implement such as a plow or harrow, connections are made with the brake pedals 28, 27 to apply the brakes automatically simultaneously with the disengaging of the clutch, by means which will now be described.

Each of the brake pedals 28, 27 is pivotally supported at 60 at its lower end and is connected with the brake mechanism (not shown) to actuate the latter. Each of the brake pedals is provided with a fore and aft extending slot 61 which receives the rear end of a link 62, the latter being pivotally connected at its forward end to the platform 31 and provided intermediate its ends with a turnbuckle 63 for adjusting the length of the link 62. The rear end of the link 62 is slidable within the slot 61 to provide a lost motion connection therebetween in order that each of the brake pedals may be operated by the operator when he is in position on the support 30, but when he falls from the support, the platform 31 swings upwardly pulling the link 62 to the forward end of the slot 61 and then exerting a forwardly acting force on the brake pedal 28 and thereby applying the brakes on each of the rear traction wheels. The strength of the spring 52 is, of course, sufficient to not only throw the clutch lever 17 into disengaged position, but apply a braking force against each of the brake pedals 26, 27.

When the tractor is to be used to supply power from its belt pulley 13, the operator's platform 31 is locked down in operating position by means of a detent or hook 65 which is connected by a transverse pivot bolt 66 to a supporting plate 67 bolted to the rear of the transmission housing 7. The hook 65 holds the platform 31 in a position slightly above the top of the housing 7 under the pressure of the spring 52, in which position the clutch and brake levers are free to be operated as if an operator were on the platform 31. When the operator remounts the platform, however, it is forced down against the top of the transmission housing 7 away from the hook 65 and the latter is then free to tip backwardly out of its engaged position, by virtue of a weighted portion 68 which biases the hook to a disengaged position, as shown in Figure 1. The hook 65 is, of course, freely swingable on the pivot bolt 66 to insure that it tips back out of engagement as soon as the operator mounts the platform so that the safety device is immediately ready for operation in case the operator should fall off the platform. If desired, the hook 65 can be provided with a spring to bias it to disengaged position instead of by the weighted portion 68. The platform 31 is provided with a rearwardly extending bar 69 which is fixed to the platform by rivets 70 and which extends rearwardly to provide an engagement for the hook 65. In Figure 2 is indicated the clearance between the hook 65 and the bar 69 when the platform is pressed firmly down against the top of the transmission housing 7.

I claim:

1. In a tractor having a control lever movable between two positions, a safety device for operating said lever comprising an operator's platform movable into engagement with the lever to move the latter into one of said positions, a seat supporting bracket rigidly fixed to the platform and movable therewith, a seat carried on said bracket, and means biasing said platform toward said engagement, said biasing means being overcome by the weight of an operator on said platform.

2. In an engine driven tractor having a clutch and a control lever therefor, a safety device for disengaging said clutch, comprising an operator's platform pivotally mounted on said tractor and movable into engagement with said clutch lever to move the latter into a position in which the clutch is disengaged, a seat supporting bracket rigidly fixed to the platform, a seat pivotally connected to said bracket for vertical swinging movement, a cushion spring supporting said seat, and biasing means urging said platform into said engagement with said lever, said biasing means being overcome by the weight of an operator on said platform, but sufficient to move said clutch lever to disengage the clutch when the operator leaves the platform.

3. For use in a machine having a control lever, a safety device for operating said lever comprising an operator's support mounted for movement between a normal position against a stop and an emergency position in engagement with said control lever, means biasing said support toward said emergency position, said biasing means being effective to move said control lever to a predetermined position when the operator is off said support but the weight of an operator thereon being effective to hold said support in said normal position against the stop, and means for optionally holding said support between said normal and emergency positions to permit said control lever to be operated without the operator being on said support, and means for releasing said holding means responsive to the weight of an operator on said support.

4. For use in a machine having a control lever, a safety device for operating said lever comprising an operator's support mounted for movement between a normal position against a stop and an emergency position in engagement with said control lever, means biasing said support toward said emergency position, said biasing means being effective to move said control lever to a predetermined position when the operator is off said support but the weight of an operator thereon being effective to hold said support in said normal position against the stop, and detent means for optionally holding said support between said normal and emergency positions, said detent being freely movable into and out of engaged position when the support is in said normal position and biased toward a disengaged position, whereby said detent is automatically disengaged from said support when the operator mounts said support.

5. In an engine driven vehicle having a clutch and a control lever therefor, a safety device for disengaging said clutch, comprising an operator's support movable into engagement with said clutch lever to move the latter into a position in which the clutch is disengaged, biasing means urging said support into said engagement with said lever, said biasing means being overcome by the weight of an operator on said support, but sufficient to move said clutch lever to disengage the clutch when the operator leaves the support, a stop for limiting the downward movement of said support under the weight of the operator, and detent means optionally engageable with said support to hold the latter in a position slightly above said stop to permit actuation of said control lever without an operator on said support, said detent means being freely disengageable when the support is against said stop and biased toward disengagement to release the detent means when an operator mounts said support.

6. In a wheel supported vehicle having a brake and a brake lever for actuating said brake, a safety device for applying said brake comprising an operator's support movable into engagement with said brake lever to actuate said brake, biasing means urging said support into said engagement with said lever, said biasing means being overcome by the weight of an operator on said support, but sufficient to move said brake lever and apply said brake when the operator is off the support, a stop for limiting the downward movement of said support under the weight of the operator, and detent means optionally engageable with said support to hold the latter in a position slightly above said stop to permit actuation of said brake lever without an operator on said support, said detent means being freely disengageable when the support is against said stop and biased toward disengagement to release the detent means when an operator mounts said support.

7. In an engine driven wheel supported vehicle having a clutch, a control lever therefor, a brake and a brake lever for actuating said brake, a safety device for disengaging said clutch and applying said brake when the operator leaves his station, comprising an operator's support movable into engagement with said clutch lever and said brake lever to actuate said levers, biasing means urging said support into engagement with said levers, said biasing means being overcome by the weight of an operator on said support, but sufficient to move said levers to disengage said clutch and apply said brake when the operator is off said support, a stop for limiting the downward movement of said support under the weight of the operator, and detent means optionally engageable with said support to hold the latter in a position slightly above said stop to permit actuation of said clutch control lever with said brake released without an operator on said support, said detent means being freely disengageable when the support is against said stop and biased toward disengagement to release the detent means when an operator mounts said support.

8. For use in a machine having a control lever, a safety device for operating said lever comprising an operator's platform mounted for movement between a normal position against a stop and an emergency position in engagement with said control lever, means biasing said platform toward said emergency position, said biasing means being effective to move said control lever to a predetermined position when the operator is off said platform but the weight of an operator thereon being effective to hold said support in said normal position against the stop, a seat supporting bracket rigidly fixed to the platform, a seat swingably connected to said bracket and movable vertically relative thereto, a cushion spring supporting said seat, and detent means engageable with said platform for optionally holding the latter between said normal and emergency positions, said detent being freely movable into and out of engaged position when said platform is in said normal position and biased toward a disengaged position, whereby said detent is automatically disengaged from said platform when the operator mounts said platform.

THEOPHILUS BROWN.